(12) United States Patent
Dantele et al.

(10) Patent No.: US 6,322,089 B1
(45) Date of Patent: *Nov. 27, 2001

(54) SUSPENSION FOR MOTOR VEHICLES

(75) Inventors: Johann Dantele, Schwebheim; Thomas Hennrich, Wörth; Christopher Frey, Hösbach, all of (DE)

(73) Assignee: Otto Sauer Achsenfabrik Keilberg, Bessenbach-Keilberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/166,280

(22) Filed: Oct. 5, 1998

(51) Int. Cl.$^7$ ........................................... B60G 3/00
(52) U.S. Cl. ........................ 280/124.128; 280/124.132; 280/124.157
(58) Field of Search ................. 280/124.116, 124.157, 280/124.1, 124.11, 124.128, 124.132

(56) References Cited

U.S. PATENT DOCUMENTS

| | | | |
|---|---|---|---|
| 3,511,332 | * 5/1970 | Hickman | 280/124.128 |
| 4,352,509 | * 10/1982 | Paton et al. | 280/124.116 |
| 5,002,305 | * 3/1991 | Raidel | 280/124.116 |
| 5,037,126 | * 8/1991 | Gottschalk et al. | 280/124.157 |
| 5,112,078 | * 5/1992 | Galazin et al. | 280/124.116 |
| 5,366,237 | * 11/1994 | Dilling et al. | 280/124.116 |
| 5,375,871 | * 12/1994 | Mitchell et al. | 280/124.157 |
| 5,639,110 | * 6/1997 | Pierce et al. | 280/124.11 |
| 5,954,351 | * 9/1999 | Koschinat | 280/124.116 |

FOREIGN PATENT DOCUMENTS

| | | |
|---|---|---|
| 19632515 | 4/1998 | (DE) . |
| 240 649 | * 10/1987 | (EP) . |
| 0402777 | 12/1990 | (EP) . |
| 458 665 A1 | * 11/1991 | (EP) . |
| 0830960A2 | 3/1998 | (EP) . |
| 2678867 | 1/1993 | (FR) . |
| 2729615 | 7/1996 | (FR) . |

* cited by examiner

Primary Examiner—J. J. Swann
Assistant Examiner—Christopher Bottorff
(74) Attorney, Agent, or Firm—Wenderoth, Lind & Ponack, L.L.P.

(57) ABSTRACT

A suspension for a motor vehicle includes at least one suspension link extending substantially in a longitudinal direction of the motor vehicle on a side of a longitudinal center plane of the motor vehicle. The link has a front end articulated on a bearing point stationary on the chassis of the motor vehicle. Spaced from such front end, the link is connected with an axle beam. The link includes a cutout, in which parts of a clamping device of a disk brake, particularly a brake cylinder, are disposed so as to be protected.

27 Claims, 2 Drawing Sheets

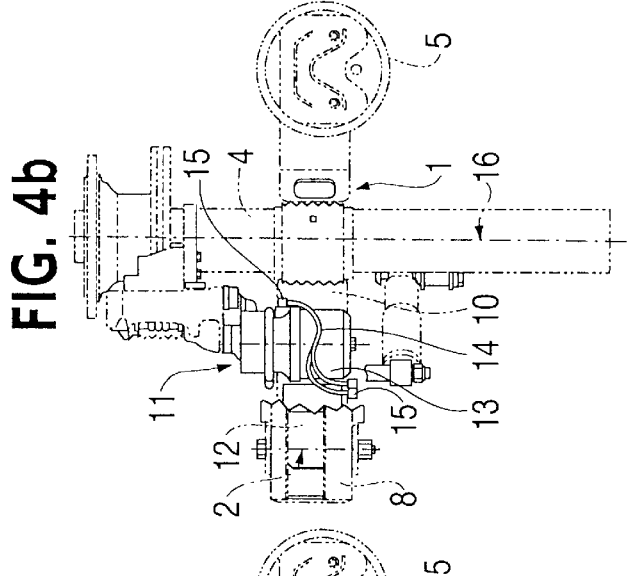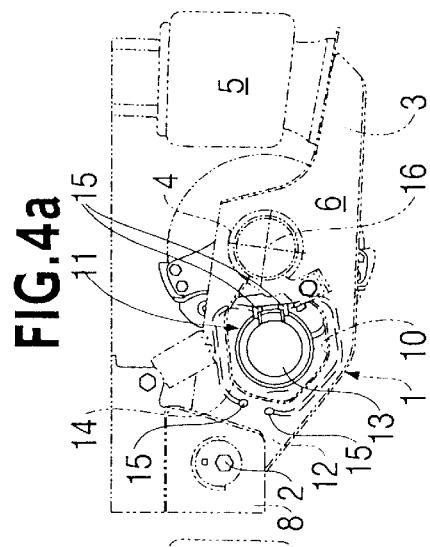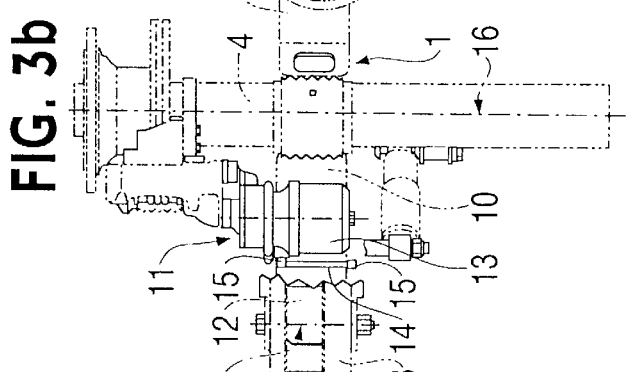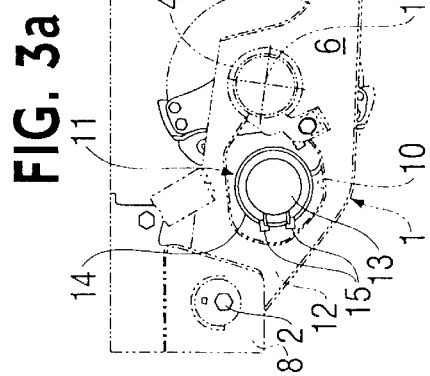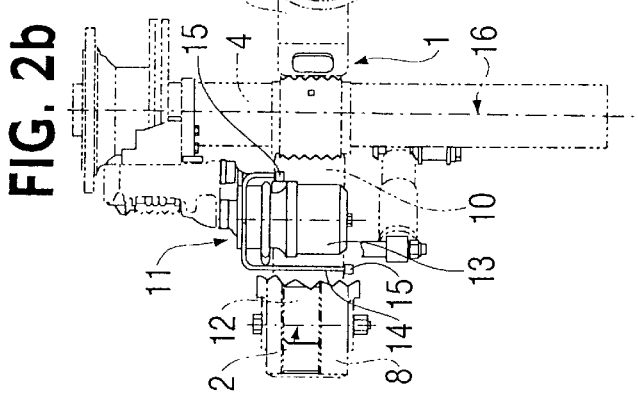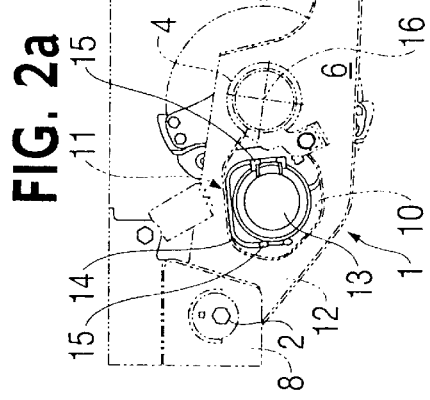

SUSPENSION FOR MOTOR VEHICLES

BACKGROUND OF THE INVENTION

The invention relates to a suspension for a motor vehicle, and including at least one link to extend substantially in the longitudinal direction of the motor vehicle, with links to be on both sides of a longitudinal center plane of the motor vehicle. The link has a front end to be articulated on a bearing point stationary on the chassis and spaced from such bearing point the link is connected with an axle beam or body. Preferably, a link segment projects from the axle beam in a rearward direction to serve as a lower support of an air spring to have an upper side supported on the motor vehicle chassis is supported. The links can accommodate a disk brake, in particular a floating caliper disk brake, for the particular associated wheel. The axle beam is a continuous round integral axle tube, which with the links forms a U-shaped stabilizer.

In known suspensions of this type, the links are disposed as a parabolic arm over the axle beam so that the actuation device of the disk brake must be rotated so far downwardly that it is exposed to an increased extent to impact from rocks, splash water and other wear and tear. In the event of collision of the motor vehicle, the disk brake can even be destroyed.

SUMMARY OF THE INVENTION

It is the object of the present invention to eliminate the disadvantages of the known suspension and to provide the suspension with a configuration to enable with simple mounting a secure accommodation of sensitive parts of a clamping device of a disk brake.

This object is achieved according to the invention by providing that a particular link has a cutout or opening in which parts of the clamping device of the disk brake, in particular the particular brake cylinder, is accommodated. Consequently, such brake part is protected against damage, which in particular is of significance for off-road vehicles. On the other hand, the link is simple to mount and readily accessible. The links can be formed advantageously of metal sheet members from which the cutouts are cut. It is also conceivable to form for reasons of stability each of the links from two vertical side walls spaced apart substantially parallel, wherein the side walls are correspondingly cut out.

The cutout preferably is disposed, relative to the driving direction, in front of the axle beam such that the brake cylinder with its supply lines is relatively close to the particular bearing point of the link and therefore is subjected only to minimal motions. In order to attain that the link is not seriously weakened by the cutout for the reception of parts of the clamping device of the disk brake, the cutout in a preferred embodiment of the invention is disposed in a neutral zone of loading of the link. It is furthermore of advantage if the supply lines of the brake cylinder also are disposed at least partially in the cutout and thus are protected against the above stated effects. Such supply lines include not only pneumatic but potential hydraulic and electrical supply lines, for example for specific sensors, such as wear sensors of the brake.

In a further special embodiment of the invention the brake cylinder-side connections of the supply lines of the brake cylinder are disposed between the brake cylinder and the bearing point of the link. This ensures additionally that the supply lines of the brake cylinder, due to their proximity to the bearing point of the particular axle rod, are exposed only to minimal motions during compression and rebound movements of the suspension. This positioning further ensures that the supply lines do not collide with other motor vehicle parts, such as transverse members, shock absorbers, etc. The connections of the supply lines of the brake cylinder can be realized differently such as, for example, for receiving previously customary rubber fabric pressure tubing. However, according to the invention they are preferably in the form of plug connections, for example for synthetic material tubing lines, in order to ensure rapid and reliable mounting and dismounting. According to a further preferred characteristic of the invention, the supply lines of the brake cylinder are at least partially positioned in hollow spaces of the link or on the link. In this way, the link can be delivered to the motor vehicle manufacturer as a modular unit including supply lines, so that the mounting in situ is simplified. For the same purpose, the supply lines extending in or on the particular link can terminate, on the one hand, in junction connectors stationary on the link in the proximity of the bearing point and, on the other hand, injunction connectors stationary on the link in the proximity of the disk brake. The motor vehicle manufacturer therefore only needs to plug in the source supply lines, for example, for compressed air and electricity at the corresponding coupling sites. Thereby, costs to install the lines on a motor vehicle are further reduced.

BRIEF DESCRIPTION OF THE DRAWINGS

Further goals, characteristics, advantages and application feasibilities of the present invention are evident in the following description of the embodiments thereof, with reference to the accompanying drawings. All described and/or graphically depicted characteristics by themselves or in any meaningful combination form the subject matter of the present invention, even independently of their inclusion in individual claims.

In the drawings:

FIGS. 2A to 4b are side views and top views of other embodiments of the suspension of the invention.

DETAILED DESCRIPTION OF THE INVENTION

Figure 1:
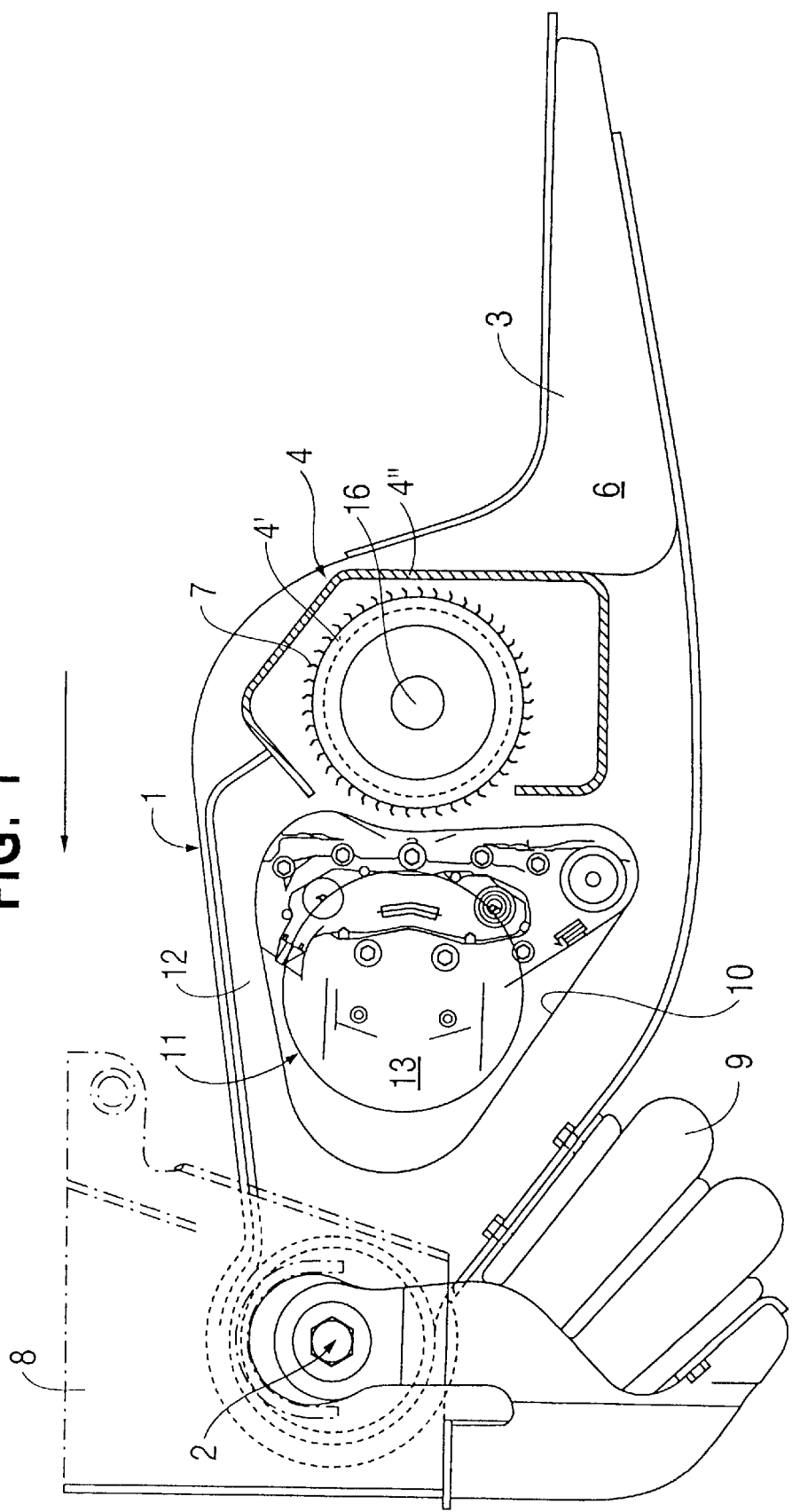
FIG. 1 is a schematic side view of a motor vehicle suspension of the invention in the region of one side (shown in vertical section) motor vehicle axle, with the configuration being implemented identically at the opposing end of the axle beam.

The depicted suspension for motor vehicles according to the invention has one each side of the longitudinal center plane of a motor vehicle one link 1, each link extending substantially in the longitudinal direction of the motor vehicle. The links 1, of which only one can be seen in the drawings, are articulated on the respective front ends (relative to a driving direction) on bearing points 2 stationary on (a) chassis of the vehicle. The bearing point 2 is provided in the case depicted by a bearing block 8 secured on the motor vehicle chassis. The bearing block 8 according to FIG. 1 serves, inter alia, also for support of the link 1 via an air spring 9 of an axle lifting arrangement. Links 1 are welded to an axle beam or body 4 at a distance behind the bearing points 2. A link segment 3 projecting in the rearward direction can serve as lower support of an air spring 5 (not shown in FIG. 1) on whose upper side the motor vehicle chassis is supported.

In the embodiment depicted in FIG. 1, the axle beam 4 is formed by two axle stubs 4' welded into, or onto, the links 1 and projecting perpendicularly outwardly therefrom, and a transverse cross member 4". FIG. 1 shows an inner side end of an axle stub 4', and the transverse cross member 4" is shown in section. The transverse cross member 4" comprises a member having a profile that is open coaxially or axially parallel relative to the axle stubs 4' and is formed by a folded metal sheet. The transverse cross member 4" forms with the two links 1 a U-shaped stabilizer in the manner of a compound spring axle. Due to the formation of the transverse cross member 4" with an open profile, it can be, on the one hand, implemented so as to be torsionally pliant and, on the other hand, to be flexurally stiff such that advantageous driving characteristics are attained during uniform but also during nonuniform spring compression of the motor vehicle wheels. In the specific illustration, the transverse cross member 4" is formed by a C-shaped member open toward the front. This is especially simple to produce.

Each link 1 comprise a link body having two vertical side walls 6 spaced apart substantially parallel, of which in FIG. 1 only the inner side wall 6 is shown. Each axle stub 4' projects at least through the respective outer side wall 6 substantially form-fittingly and contacts with its inner end the outside of the respective inner side wall 6. The axle stub 4' is welded to the outer side wall 6 of the link 1 as well as also to the inner side wall 6 by welds 7 encircling the axle stub 4'. Such welds 7 specifically preferably are on the outside as well as also on the inside of the outer side wall 6, and, it is understood, also on the outside of the inner side wall 6, on which abuts the inner end of the axle stub 4'. In the embodiment according to FIG. 1, the axle stub 4' also projects through the inner side wall 6 of the link 1 such that it projects only slightly beyond the inside of the inner side wall 6. In this case, the axle stub 4' is also welded on the outside as well as also on the inside of the inner side wall 6 by circumferential welds 7. The transverse cross member 4" only needs to be connected with the inner side wall 6 of each of the links 1.

According to the embodiment illustrated in FIG. 1, each link 1 has a cutout or opening 10, in which parts of clamping devices of a disk brake 11, in particular a brake cylinder 13, are disposed. The cutout 10 is provided, as viewed in the driving direction, in front of the axle beam 4. Cutout 10 furthermore is disposed in a neutral zone or are of loading of the link 1. Further, cutout 10 is located to ensure that the brake cylinder 13 is disposed at the level of a connecting line extending between bearing point 2 and a center point 16 of the axle beam 4.

In FIGS. 2a to 4b are shown three different embodiments of a suspension according to the invention which differ substantially only by the arrangement of supply lines 14 to particular brake cylinders 13. Contrary to FIG. 1, here the axle beam 4 is formed by a continuous axle tubing which is received in the side walls 6 of the links 1. In each case, it is ensured that supply lines 14 are at least partially also disposed in the cutout 10 and thus are protected. Brake cylinder-side connections 15 of supply lines 14 of the particular brake cylinder 13 preferably are disposed between the brake cylinder 13 and the bearing point 2 of the link 1. Thus, connections 15 are exposed to minimum motion during compression and rebounding movements of the suspension. The connections 15 of the supply lines 14 of the particular brake cylinders 13 preferably are realized as plug connections, for example for synthetic material conduits. The supply line 14 of the particular brake cylinder 13 can further extend at least partially, thus in their segment or portion in front of the cutout 10, in or on the link 1 such that the links 1 can be delivered to the motor vehicle manufacturer in preassembled form. The supply line 14 enters, for example, adjacent to the bearing point 2 into a hollow space of the link 1 and exit therefrom adjacent to the cutout 10 in which the brake cylinder 13 is disposed. The supply lines 14 extending in or on the particular link 1 terminate preferably, on the one hand, in junction connectors stationary on the link in the proximity of the bearing point 2 and, on the other hand, in connection jacks, stationary on the link in the proximity of the disk brake 11. Thus, the corresponding source supply lines, for example for compressed air and electricity and respective connection lines to the brake cylinder and the associated sensors need to be connected only to corresponding junction connectors.

What is claimed is:

1. A suspension assembly for a motor vehicle, said assembly comprising:
    a link to extend substantially in a longitudinal direction of the motor vehicle on a side of a longitudinal center plane of the motor vehicle, said link having a front end to be articulated to a chassis of the motor vehicle and a rear end to support an air spring of the motor vehicle;
    an axle beam extending transverse to said link and connected thereto at a position between said front and rear ends of said link; and
    said link having an opening of a configuration to receive parts of a disk brake of the motor vehicle.

2. An assembly as claimed in claim 1, comprising two said links, one each to be positioned to extend on a respective side of the longitudinal center plane of the motor vehicle, each said link having therein a respective said opening, and said axle beam being connected to both of said links.

3. An assembly as claimed in claim 1, wherein said opening is located forwardly of said axle beam.

4. An assembly as claimed in claim 1, wherein said opening is located between said front end of said link and said axle beam.

5. An assembly as claimed in claim 1, wherein said opening is located in an area of said link that is relatively neutral with respect to loading of said link during use of said suspension assembly when assembled to the motor vehicle.

6. An assembly as claimed in claim 1, wherein said opening is located along an imaginary line extending between said axle beam and said front end of said link.

7. A link to be employed as part of a suspension assembly of a motor vehicle and to extend substantially in a longitudinal direction of the motor vehicle on a side of a longitudinal center plane of the motor vehicle, said link comprising:
    a link body having a front end to be articulated to a chassis of the motor vehicle and a rear end to support an air spring of the motor vehicle;
    a portion positioned rearwardly of said front end to be connected to an axle beam to extend transversely of the motor vehicle; and
    said link body having an opening of a configuration to receive parts of a disk brake of the motor vehicle.

8. A link as claimed in claim 7, wherein said opening is located forwardly of said portion.

9. A link as claimed in claim 7, wherein said opening is located between said front end of said link body and said portion.

10. A link as claimed in claim 7, wherein said opening is located in an area of said link body that is relatively neutral with respect to loading of said link body during use of the suspension assembly when assembled to the motor vehicle.

11. A link as claimed in claim 7, wherein said opening is located along an imaginary line extending between said portion and said front end of said link body.

12. An assembly of a disk brake of a motor vehicle and a suspension assembly of the motor vehicle, said assembly comprising:

a link to extend substantially in a longitudinal direction of the motor vehicle on a side of a longitudinal center plane of the motor vehicle, said link having a front end to be articulated to a chassis of the motor vehicle and a rear end to support an air spring of the motor vehicle;

an axle beam extending transverse to said link and connected thereto at a position between said front and rear ends of said link; and said link having therein an opening; and parts of said disk brake being positioned in said opening.

13. An assembly as claimed in claim 12, comprising two said disk brakes and two said links, each said link to be positioned to extend on a respective side of the longitudinal center plane of the motor vehicle, each said link having therein a respective said opening, said axle beam being connected to both of said links, and each said disk brake having parts positioned in a said opening of a respective said link.

14. An assembly as claimed in claim 12, wherein said opening is located forwardly of said axle beam.

15. An assembly as claimed in claim 12, wherein said opening is located between said front end of said link and said axle beam.

16. An assembly as claimed in claim 12, wherein said opening is located in an area of said link that is relatively neutral with respect to loading of said link during use of said suspension assembly when assembled to the motor vehicle.

17. An assembly as claimed in claim 12, wherein said opening is located along an imaginary line extending between said axle beam and said front end of said link.

18. An assembly as claimed in claim 12, wherein said parts of said disk brake comprise parts of a clamping device of said disk brake.

19. An assembly as claimed in claim 12, wherein said parts of said disk brake comprise a brake cylinder of said disk brake.

20. An assembly as claimed in claim 19, further comprising supply lines of said brake cylinder disposed at least partially in said opening.

21. An assembly as claimed in claim 20, further comprising connections connecting said supply lines to said brake cylinder, said connections being disposed between said brake cylinder and said front end of said link.

22. An assembly as claimed in claim 21, wherein said connections comprise plug connections.

23. An assembly as claimed in claim 22, wherein said supply lines comprise conduits formed of synthetic material.

24. An assembly as claimed in claim 20, wherein said supply lines extend at least partially within said link.

25. An assembly as claimed in claim 20, wherein said supply lines extend at least partially on said link.

26. An assembly as claimed in claim 20, wherein said supply lines extend partially within said link and partially on said link.

27. An assembly as claimed in claim 20, wherein each said supply line has one end terminating in a junction connector stationary on said link at a position adjacent said front end of said link and another end terminating in a junction connector stationary on said link at a position adjacent said disk brake.

* * * * *